United States Patent [19]

Nishimura

[11] Patent Number: 5,764,909
[45] Date of Patent: Jun. 9, 1998

[54] SELF-CONFIGURING DEVICE CONNECTION FOR A DATA INDEPENDENT TYPE COMPUTER SYSTEM IN A NETWORK

[75] Inventor: Takeshi Nishimura, Kawasaki, Japan

[73] Assignee: Fujitsu Limited, Kawasaki, Japan

[21] Appl. No.: 559,827

[22] Filed: Nov. 17, 1995

[30] Foreign Application Priority Data

Nov. 18, 1994 [JP] Japan ................................ 6-284805

[51] Int. Cl.⁶ .................................................. G06F 12/02
[52] U.S. Cl. ............................ 395/200.53; 395/200.51; 364/DIG. 1
[58] Field of Search ......................... 395/200.02, 750, 395/800, 200.53; 364/489

[56] References Cited

U.S. PATENT DOCUMENTS 4,989,139  1/1991  Friedman et al. ............. 395/200.02
5,452,231  9/1995  Butts et al. ...................... 364/489
5,504,921  4/1996  Dev et al. ........................ 395/800
5,598,566  1/1997  Pascucci et al. ................. 395/750

Primary Examiner—Tod R. Swann
Assistant Examiner—David Langjahr
Attorney, Agent, or Firm—Staas & Halsey

[57] ABSTRACT

Processing machines which perform operational processing, data machines which perform data access and/or man-machine interface machines which perform man-machine interface processing, are in a configuration in which they are connected to a network. A first network manager which is connected to the network manages the connection attributes among said machines and the connection relationships among said machines by mutual sending and receiving of electronic statements. A second network manager manages the connection relationships of said machines in a plurality of local networks which comprise a single large network.

8 Claims, 12 Drawing Sheets

FIG. 6A

FORMAT OF ELECTRONIC STATEMENTS A AND B

| ELECTRONIC STATEMENT CONTROL | OPERATION ID | SCREEN ID | SCREEN CONTROL INFORMATION | DATA AREA INFORMATION | DATA AREA 1 | DATA AREA 2 |
|---|---|---|---|---|---|---|
| 601 | 602 | 603 | 604 | 605 | 606 | 606 |

FIG. 6B

FORMAT OF ELECTRONIC STATEMENTS C AND D

| ELECTRONIC STATEMENT CONTROL | OPERATION ID | FILE ID | SEARCH CONTROL INFORMATION | DATA AREA INFORMATION | DATA AREA 1 | DATA AREA 2 |
|---|---|---|---|---|---|---|
| 601 | 602 | 607 | 608 | 605 | 606 | 606 |

FIG. 6C

FORMAT OF ELECTRONIC STATEMENT CONTROL

| ELECTRONIC STATEMENT IDENTIFICATION CODE | SOURCE ID | DESTINATION ID | USER ID | ELECTRONIC STATEMENT IDENTIFICATION SERIAL NUMBER | SENDING TIME |
|---|---|---|---|---|---|
| 609 | 610 | 611 | 612 | 613 | 614 |

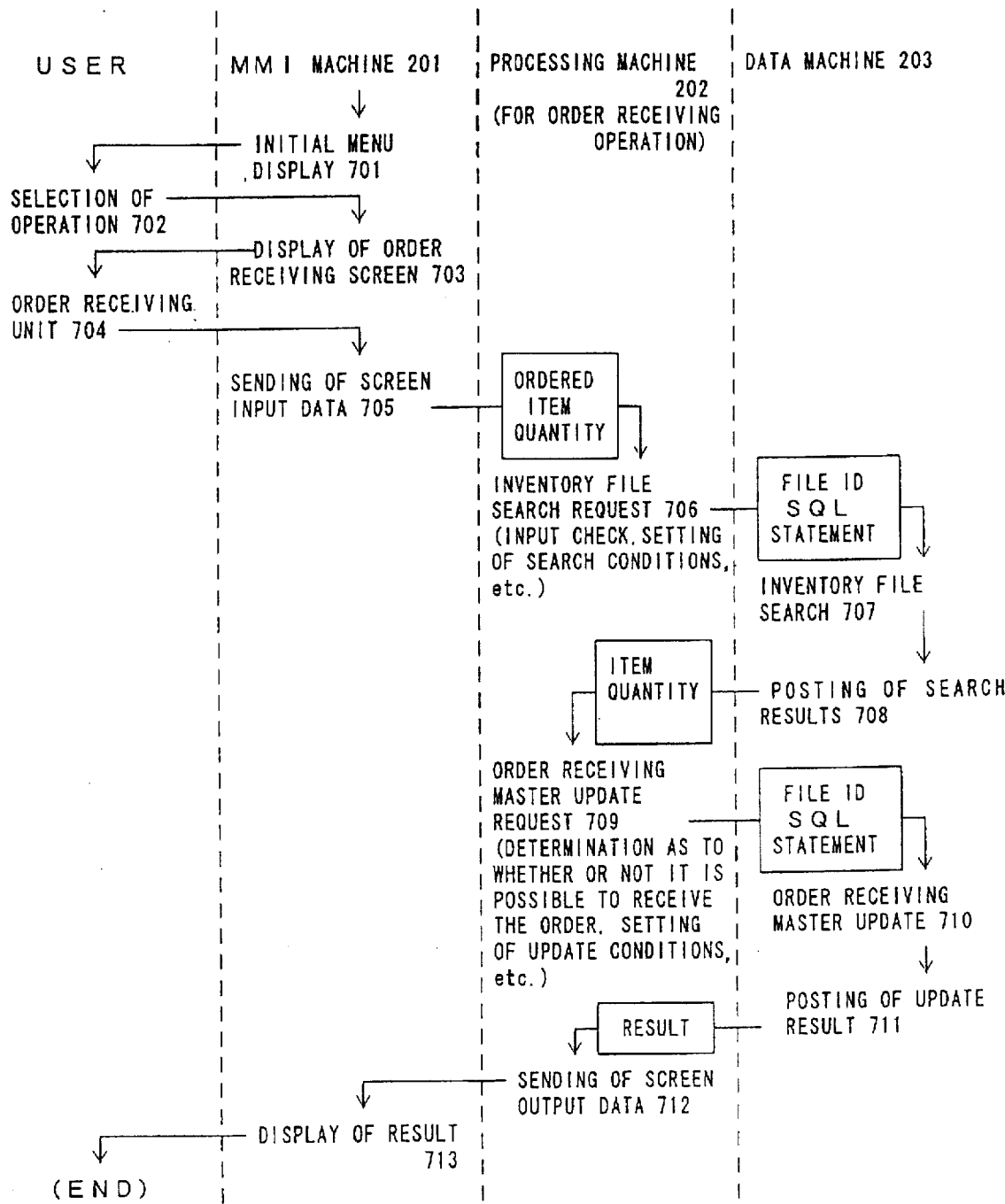
F I G. 7

FIG. 8A FORMAT OF ELECTRONIC STATEMENTS E, G AND I
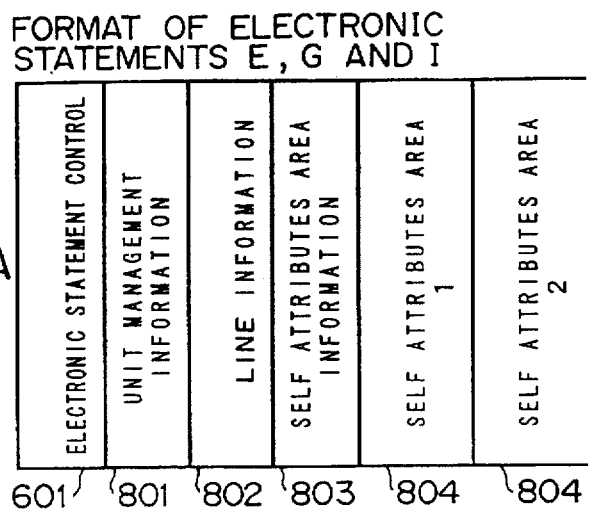
FIG. 8B FORMAT OF ELECTRONIC STATEMENTS F, H AND J
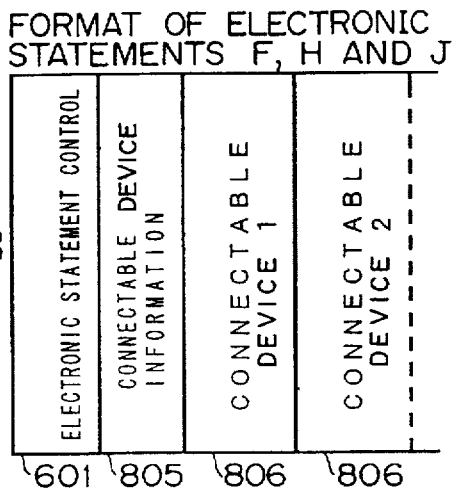
FIG. 8C FORMAT OF ELECTRONIC STATEMENT M
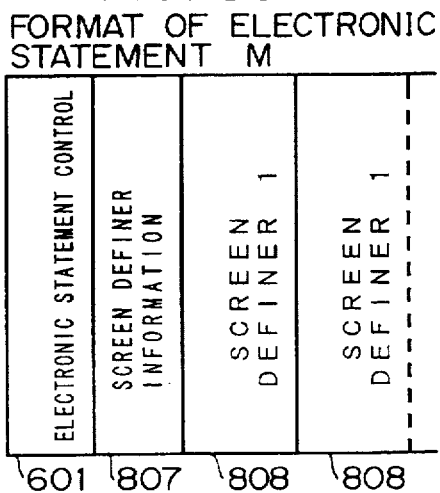
FIG. 8D FORMAT OF ELECTRONIC STATEMENT K
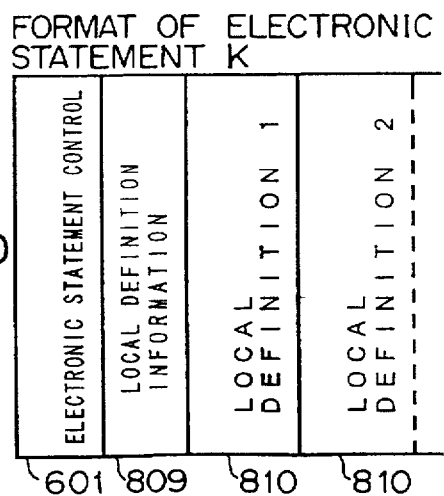
FIG. 8E FORMAT OF ELECTRONIC STATEMENT L
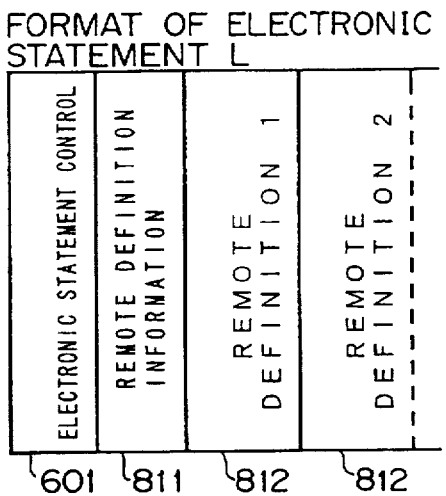

BASIC INFORMATION 901

| 903 | 904 | 905 | 906 | 906 |
|---|---|---|---|---|
| MMI MACHINE 1 | LOCAL | LINE INFORMATION | ATTRIBUTE 1 | ATTRIBUTE 2 | - - |
| MMI MACHINE 2 | REMOTE | LINE INFORMATION | ATTRIBUTE 1 | ATTRIBUTE 2 | - - |
| - - | | | | | |
| PROCESSING MACHINE 1 | LOCAL | LINE INFORMATION | ATTRIBUTE 1 | ATTRIBUTE 2 | - - |
| - - | | | | | |
| DATA MACHINE 1 | LOCAL | LINE INFORMATION | ATTRIBUTE 1 | ATTRIBUTE 2 | - - |
| - - | | | | | |

CONNECTION INFORMATION 902

FIG. 10A

OVERALL INFORMATION 1001

| LOCAL ID | REMOTE LINE INFORMATION 1007 | ATTRIBUTE 1 1008 | ATTRIBUTE 2 1008 | - - - |
|---|---|---|---|---|

BASIC INFORMATION 1002

| LOCAL ID 903 | MMI MACHINE 1 | LINE INFORMATION 905 | ATTRIBUTE 1 906 | ATTRIBUTE 2 906 | - - - |
|---|---|---|---|---|---|
| LOCAL ID | MMI MACHINE 2 | LINE INFORMATION | ATTRIBUTE 1 | ATTRIBUTE 2 | - - - |
| - - - | | | | | |
| LOCAL ID | PROCESSING MACHINE 1 | LINE INFORMATION | ATTRIBUTE 1 | ATTRIBUTE 2 | - - - |
| - - - | | | | | |

CONNECTION INFORMATION 1003

| LOCAL ID | MMI 1 | LOCAL ID | PROCESSING MACHINE 1 | LOCAL ID | DATA MACHINE 1 |
|---|---|---|---|---|---|
| LOCAL ID | MMI 2 | LOCAL ID | PROCESSING MACHINE 2 | LOCAL ID | DATA MACHINE 2 |

1005

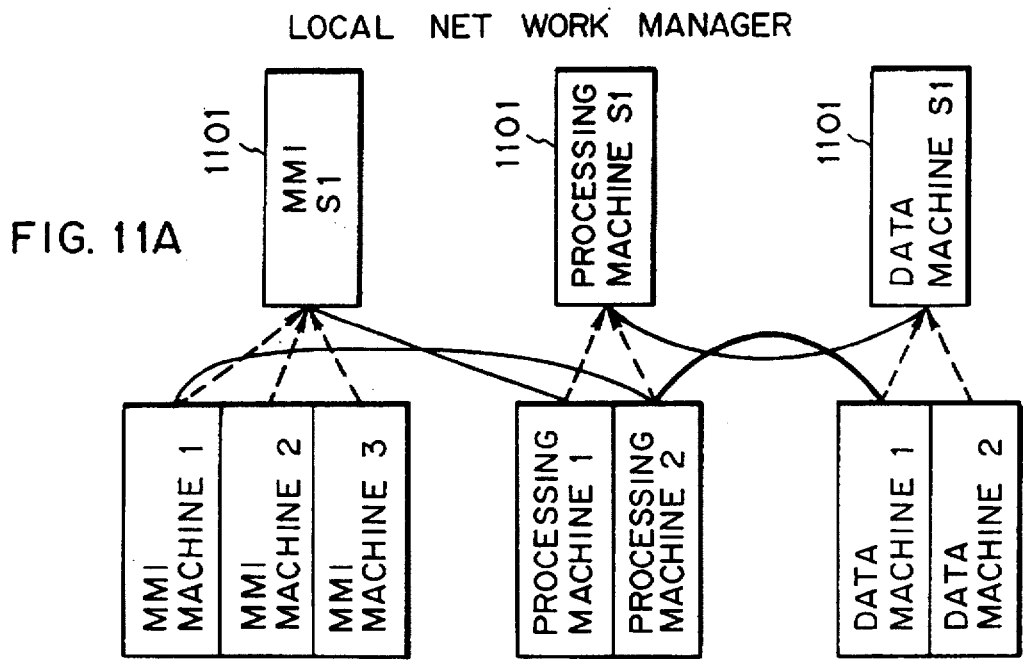
FIG. 11A  LOCAL NETWORK MANAGER
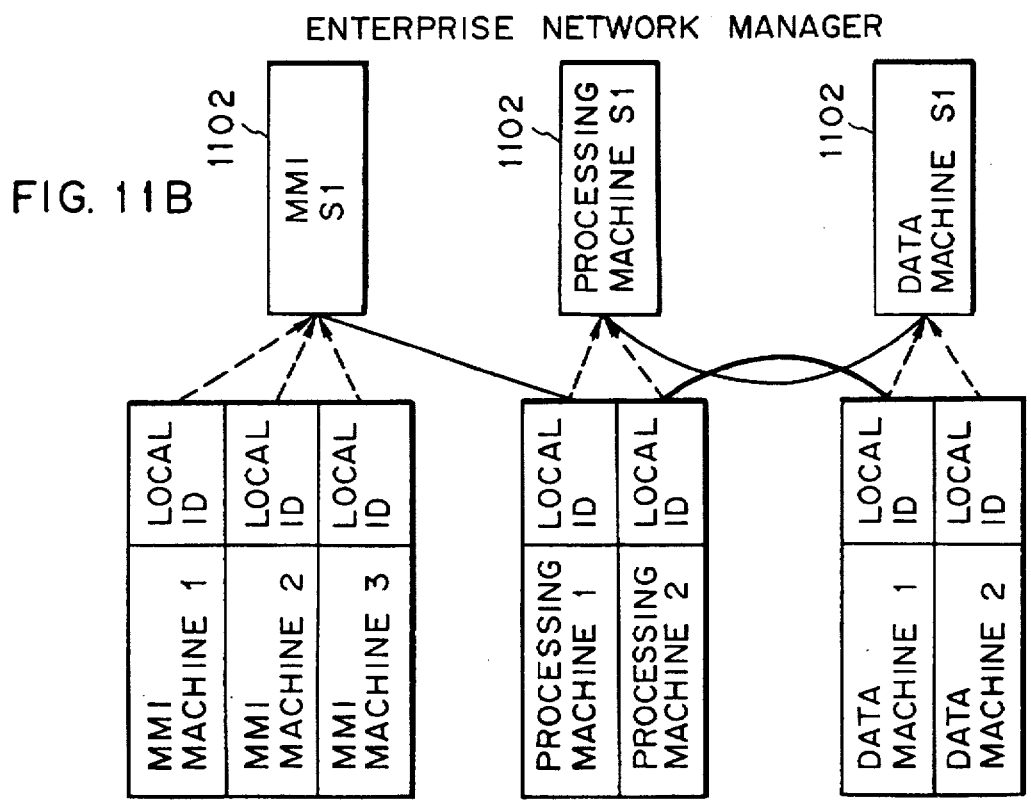
FIG. 11B  ENTERPRISE NETWORK MANAGER
(- - -→ : SUPER CLASS DEFINITION,  ——— : CONNECTION,  ——— : NO CONNECTION)

SELF-CONFIGURING DEVICE CONNECTION FOR A DATA INDEPENDENT TYPE COMPUTER SYSTEM IN A NETWORK

BACKGROUND OF THE INVENTION

1. Field of the Invention

This invention relates to a technology for constructing a computer system.

2. Description of the Related Art

Generally, in existing computer systems, a general-purpose operating system (referred to hereafter as an OS) is executed on general-purpose hardware, from the consideration of making the most effective use of expensive hardware, and the OS is made compatible with as many applications as possible.

However, since the general-purpose capability involves a certain amount of redundancy, as technology has developed so the OS has become quite large, and so has its overhead. In addition, since existing computers are generally designed so that many applications can be executed in parallel on a single general-purpose computer machine, the computer machine itself has become quite large and has a complicated configuration, resulting in a lowering of the performance and reliability of the computer system as a whole.

Today, when we are seeing dramatic improvements in the ratio of performance to hardware price, the disadvantages of having a system compatible with a wide variety of applications are becoming more apparent than the advantages.

In addition, until now the configuration of a computer system and the form of execution have been different matters from the organization in which it is used, such as a company, and the way that work is done in that organization. Consequently, until now difficulty has been encountered when, for example, a specialist in a certain type of operation puts that operation onto a computer system. One reason for this is that end-user computing has been excluded from the basic considerations upon which computer systems have been constructed. Another reason is that in the past the specialists have not understood the computer systems, so the construction of the computer systems has been left entirely to the system developers, who in turn do not understand the work that will be done on the computer.

In particular, in recent years, there has been a trend toward connecting computer systems in networks to provide flexibility in processing operations in companies; until now, when a new computer is connected to such a network, it has been necessary for a specialist having specialized knowledge of the computer system to perform complicated parameter settings. A specialist in the work being performed who does not have much knowledge about computers cannot easily construct a network, but must rely on the computer system developer.

SUMMARY OF THE INVENTION

This invention has been conceived against the background described above. Its purpose is to provide a computer system that combines simple configuration with high reliability and performance, and in addition makes it easy to construct a network that conforms to the configuration and the procedures of the work done by the operators.

This invention presupposes the availability of a system that automatically creates device connection definitions in a data independent type computer system which has a configuration in which at least one of the following is connected to a network:

- A processing machine which receives electronic messages in which work processing requests are stored from the network, sends electronic statements in which work processing results are stored to the network, sends electronic statements in which data access requests are stored to the network, receives electronic statements in which the results of data access are stored from the network, and executes processing operations with respect to said sent and received electronic statements; and/or

- A data machine which receives electronic messages in which data access requests are stored from the network, sends electronic messages in which the results of data access requests are stored to the network, and performs access to stored data in response to said stored sent and received electronic messages; and/or

- A man-machine interface machine which sends electronic statements in which requests for operational processing are stored to the network, receives electronic statements in which the results of operational processing requests are stored from the network, and executes man-machine interface processing in response to said sent and received electronic messages.

Accordingly, the first mode of this invention has a configuration which includes a first network manager which is connected to the network and manages the connection attributes in a case in which a processing machine, data machine, and/or man-machine interface machine is/are connected to the network; and the connection relationships among the processing machine, data machine and/or man-machine interface machine on the network.

Next, the second mode of this invention presupposes a configuration in which a network is made up of a plurality of local networks.

In this case, the first network manager which is connected to the local networks manages the connection attributes in a case in which a processing machine, data machine, and/or man-machine interface machine is/are connected to the network; and the connection relationships among the processing machine, data machine and/or man-machine interface machine on the network.

The configuration also includes a second network manager which is connected to one of the local networks and manages the connection attributes in a case in which processing machines, data machines, and/or man-machine interface machines are connected to the plurality of local networks; and the connection relationships among the processing machines, data machines and man-machine interface machines on the local networks.

In the first and second modes of this invention described above, as a result of specialization of the processing machines, data machines, etc. to correspond to the functions and data required in a particular operation, and the limitation of communication among machines to electronic statements on the operational level, it has become possible to make the configuration of a computer system and its mode of execution correspond to the human organization (such as a company) in which the work is done and the way that work is done in that organization. As a result, even if a specialist in the work does not know much about computers or networks, it is easy to construct the system. Specifically, in the definition of the connection information that is managed by the first network manager or the second network manager (the device connection definition), each machine responds directly to the processing of its respective operations, so the device connection definition can be performed in the same manner as definition of the relationships among operation processings. Consequently, when a local manager performs a local network definition in the first network manager or the overall manager performs an overall network definition (a remote definition) in the second network manager, it is not necessary to have special knowledge concerning computers and networks. Thus, it is possible to greatly reduce the burden and the cost for both the vendor and the customer when a computer system is constructed. In addition, since the hierarchical structure of the device connection definition composed of the first network manager and the second network manager can respond to the hierarchical structure of the operational processing, also from this point of view it is possible to manage the device connection definition intuitively.

In addition, in this invention, the first or the second network manager can effectively perform device connection definitions by coordinating the common connection attributes or connection relationships among a plurality of processing machines, data machines and/or man-machine interface machines, and in addition incorporating a hierarchically-managed format (super class definition).

BRIEF DESCRIPTION OF THE DRAWINGS

Other purposes and features of this invention will be easily understood by anyone skilled in the art from the description of the preferred embodiments and with reference to the drawings.

FIGS. 6A to 6C show formats (example 1) of an electronic statement;

FIG. 7 is a diagram that explains the process of a preferred embodiment (example 1);

FIGS. 8A to 8E show formats (example 2) of an electronic statement;

FIGS. 10A to 10C are configuration diagrams of a connection management table managed by the enterprise network manager;

FIGS. 11A and 11B are configuration diagrams of connection information using the super class.

DESCRIPTION OF THE PREFERRED
EMBODIMENTS EXPLANATION OF THE
PRINCIPLE

Figure 1:
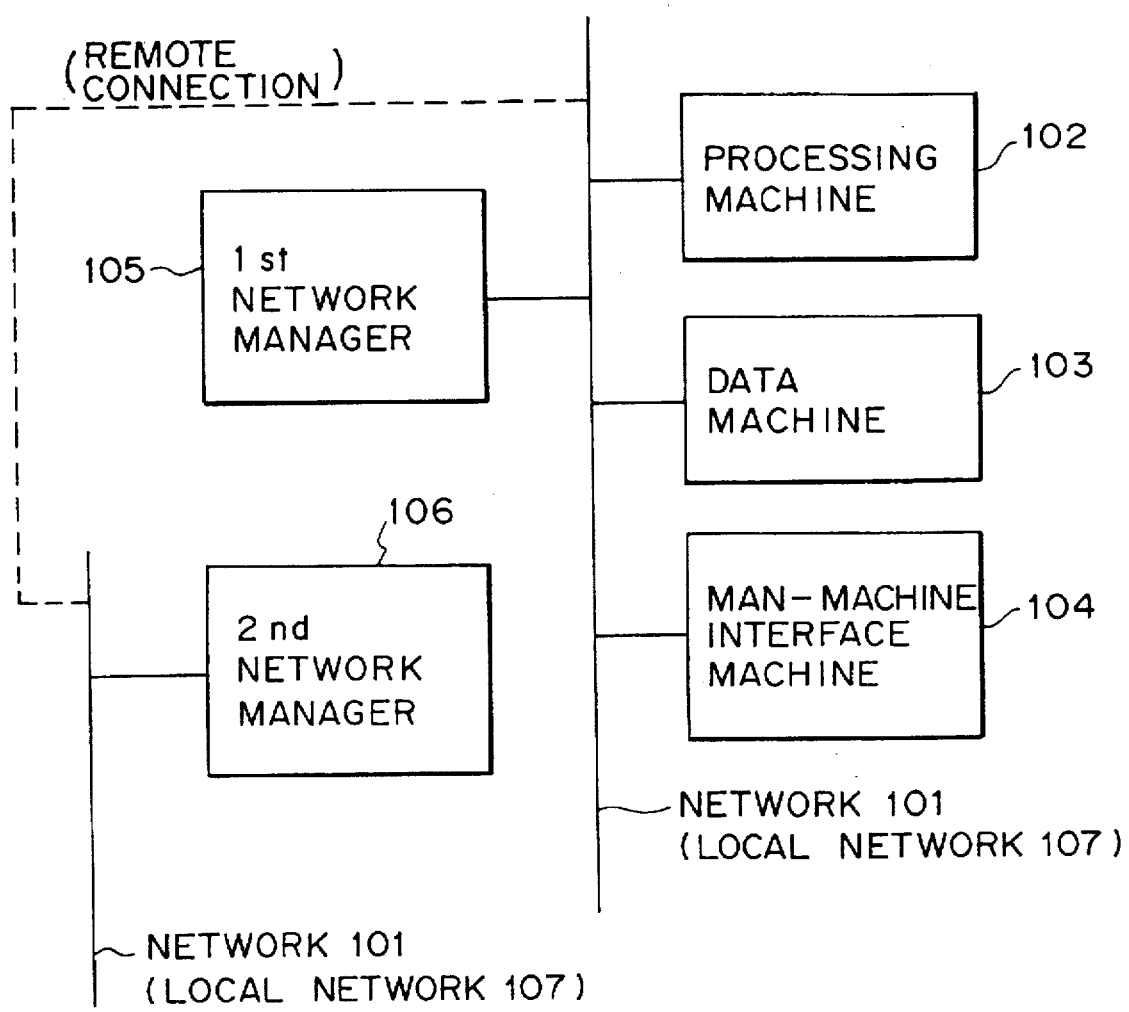
FIG. 1 is a block diagram of the principle of this invention.

FIG. 1 is a block diagram of the principle of this invention.

This invention presupposes the availability of a data independent type computer system that has a configuration in which at least one of the processing machine 102, the data machine 103 and/or the man-machine interface machine 104, to be discussed below, is connected to the network 101.

The processing machine 102 receives electronic statements in which operational processing requests are stored from the network 101, sends electronic statements in which results of operational processing are stored to the network 101, sends electronic statements in which data access requests are stored to the network 101, receives electronic statements in which the results of data access are stored from the network 101, and executes operational processing corresponding to those electronic messages which are sent and received.

The data machine 103 receives electronic messages in which data access requests are stored from the network 101, sends electronic messages in which the results of data access are stored to the network 101, and accesses stored data corresponding to those electronic messages which are sent and received.

The man-machine interface machine 104 sends electronic statements in which operational processing requests are stored to the network 101, receives electronic statements in which the results of operational processing are stored from the network 101, and executes man-machine interface processing corresponding to those electronic statements which are sent and received.

Assuming the availability of a computer system as described above, this invention has a first network manager 105 (the local network manager 205 in FIG. 2) that is connected to the network 101 and manages the connection attributes (the basic information 901 in FIG. 9A) in the case in which the processing machine 102, the data machine 103 and/or the man-machine interface machine 104 is/are connected to the network 101, and the connection relationships (the connection information 902 in FIG. 9B) among the processing machine 102, the data machine 103 and/or the man-machine interface machine 104 on the network 101. At the time at which one of the processing machine 102, the data machine 103 and the man-machine interface machine 104 is connected to the network 101, this first network manager 105 obtains the connection attributes of these machines by receiving electronic statements (the electronic statements E, G and I in FIG. 8A) in which the connection attributes of those machines are stored; receives information concerning changes in the connection relationships among the processing machine 102, the data machine 103 and/or the man-machine interface machine 104 on the network 101; and, at the time at which a change in a connection relationship occurs sends electronic statements (the electronic statements F, H and J in FIG. 8B) in which information concerning the change in the connection relationship is stored to whichever among the processing machine 102, the data machine 103 and/or the man-machine interface machine is/are involved in that change. Then, whichever among the processing machine 102, the data machine 103 and/or the man-machine interface machine 104 received those electronic statements, changes its/their own connection status based on the information concerning the change in the connection relationship that is stored in those electronic statements.

In the configuration of the invention described above, when the network 101 consists of a plurality of local networks 107, the first network manager 105 is connected to the local networks 107 and, when a processing machine 102, data machine 103 and/or man-machine interface machine 104 is connected to a local network 107, manages the connection attributes and the connection relationships among the processing machine 102, the data machine 103 and/or the man-machine interface machine 104 on the local network 107.

There is also a second network manager 106 that is connected to one of the local networks 107 and, when one of a processing machine 102, a data machine 103 and a man-machine interface machine 104 is connected to a local network 107, manages the connection attributes (the basic information 1002 in FIG. 10B) and the connection relationships among the processing machine 102, the data machine 103 and/or the man-machine interface machine 104 on the local network 107 (the overall information 1001 and the connection information 1003 in FIGS. 10A and C). At a time at which the management status of the connection attributes or the connection relationships in the first network manager 105 changes, this second network manager 106 changes its own management status by receiving an electronic statement (an electronic statement K) in which information relating to the change in the management status of the connection attributes or the connection relationships is stored from the first network manager 105 in which that change occurred. In addition, the second network manager 106 receives the change in the connection relationships among the processing machine 102, the data machine 103 and/or the man-machine interface machine 104, and, at the time at which that change in the connection relationships occurs, sends an electronic message (the electronic message L) in which information relating to the change in the connection relationships is stored to the first network manager 105 that is concerned with that change. Then the first network manager 105 that receives that electronic statement changes its own management status based on the information relating to the change in the connection relationships that is stored in that electronic statement.

In the configuration of the invention described above, the first network manager 105 or the second network manager 106 has a configuration that incorporates the form defined using superclass ((definitions) that consolidates the management of common connection attributes and/or connection relationships among a plurality of processing machines 102, data machines 103 and/or man-machine interface machines 104. In addition, it can be composed to include a form that also performs hierarchical consolidated management of the common connection attributes and/or common connection relationships.

In this invention which has the principle configuration described above, the computer system functions are divided into 3 separate functions: man-machine interface, processing, and data; and separate machines for each function, the man-machine interface machines 104, the processing machines 102 and the data machines 103, are connected by the network 101.

Thus, by means of a configuration in which pieces of hardware possessing specialized functions are connected by a network, the first advantage that is obtained is that the system configuration, which until now has been excessively large, is simplified. That is to say, first of all the function of the processing machine 102 is very simple. Specifically, the hardware and the operational processing software are provided in a single unit, and it is guaranteed that only certain specialized software can be executed on each piece of hardware. For this reason, in the memory management, the allocation of memory area is fixed and virtual space control, etc., becomes unnecessary, which in turn makes control of swap-in/swap-out, etc., of program data unnecessary. In addition, task control need be only single task control, so that control of process management, priority management, etc. becomes unnecessary. Thus, in the processing machine 102, most of the functions that are presently necessary in an operating system become unnecessary. Also, the data machine 103 needs only have the functions data search or update, or data write-in or read-out, so its function is extremely simple. Further, the man-machine interface machine 104 needs only have the man-machine interface function; it no longer needs to have the data storage function. For this reason, the man-machine interface machine 104 can be made simple, in the order of an existing personal computer. By simplifying the computer system in this way, the reliability of the overall system is greatly improved, and it becomes possible to use inexpensive CPUs for the processing machines 102, etc., thereby greatly increasing the performance-to-cost ratio of the computer system.

In addition, since it is easy to add or replace machines as the requirements of the work increase, it is possible to construct a computer system that can flexibly respond to the needs of the work and offers an abundance of expansion options. If a separate data machine 103 is provided for each data base, the danger that a given operation will be delayed by another operation is greatly reduced. Further, as a result of providing the processing machine 102 and the man-machine interface machine 104 as integrated hardware and software, all that is necessary is to simply connect these to the network 101 and setup can be completed simply by turning the power ON, and if trouble should occur all that is necessary is to replace the unit in which it occurs.

In addition, the first network manager 105 and the second network manager 106 manage the respective connection information for the connections of the machines 102, 103 and 104 to the network 101, so that if a new device is connected to the network 101, an electronic statement in which that connection information is stored is automatically sent from that device to the network 101. Consequently, it is possible to concentrate the operation management for the overall computer system and problem management in the first network manager 105, the second network manager 106, the network 101, and the data machines 103, dramatically simplifying the management of the computer system.

A second advantage of this invention is that by having a configuration in which machines having specialized functions are connected to a network, it becomes easy to simplify the communication specifications for communication among the machines. Specifically, communications among the machines are standardized in the form of operational level electronic statements consisting of information that is easily related to operations, such as the user ID, the operation ID, the screen ID, the file ID, the SQL statement, etc., and the operational processing is left to machines that have specialized independent functions. As a result, it becomes possible to reuse the machines and reduce the amount of redundancy in development.

A third advantage of this invention is that the processing machines 102, the data machines 103, etc. are specialized for the functions and data corresponding to specific operations, and in addition the communications among machines are limited to operational level electronic statements, as a result of which the computer system configuration and execution format can be made to correspond to the organization and work procedures of business companies etc. As a result, a specialist in the work can easily construct a computer system without requiring much knowledge about computers and networks. Specifically, in the definitions of information on the connections managed by the first network manager 105 and the second network manager 106 (the device connection definitions), the respective machines 102, 103 and 104 correspond directly to the operational processing, so the device connection definitions can be performed in the same manner as definitions of the relationships among the different operational processings. Consequently, when the local manager performs a local network definition in the first network manager 105, and when the overall manager performs a network definition (a remote definition) in the second network manager 106, special knowledge relating to computers and networks is not required. This greatly reduces the burdens on both the vendor and the customer, as well as the cost, when a computer system is constructed. In addition-, since the hierarchical structure of the device connection definitions consisting of the first network manager 105 and the second network manager 106 can be made to correspond to the hierarchical structure of the operational processing, with regard to this point as well, the management of the device connection definitions can be made intuitive.

In addition, the first and second network managers 105 and 106 can coordinate the common connection attributes or connection relationships among a plurality of processing machines 102, data machines 103 and/or man-machine interface machines 104, and incorporate a hierarchical management format (super class definition), so that the device connection definitions can be performed efficiently.

EXPLANATION OF THE PREFERRED EMBODIMENT

Now the preferred embodiment of this invention will be explained in detail with reference to the drawings.

Figure 2:
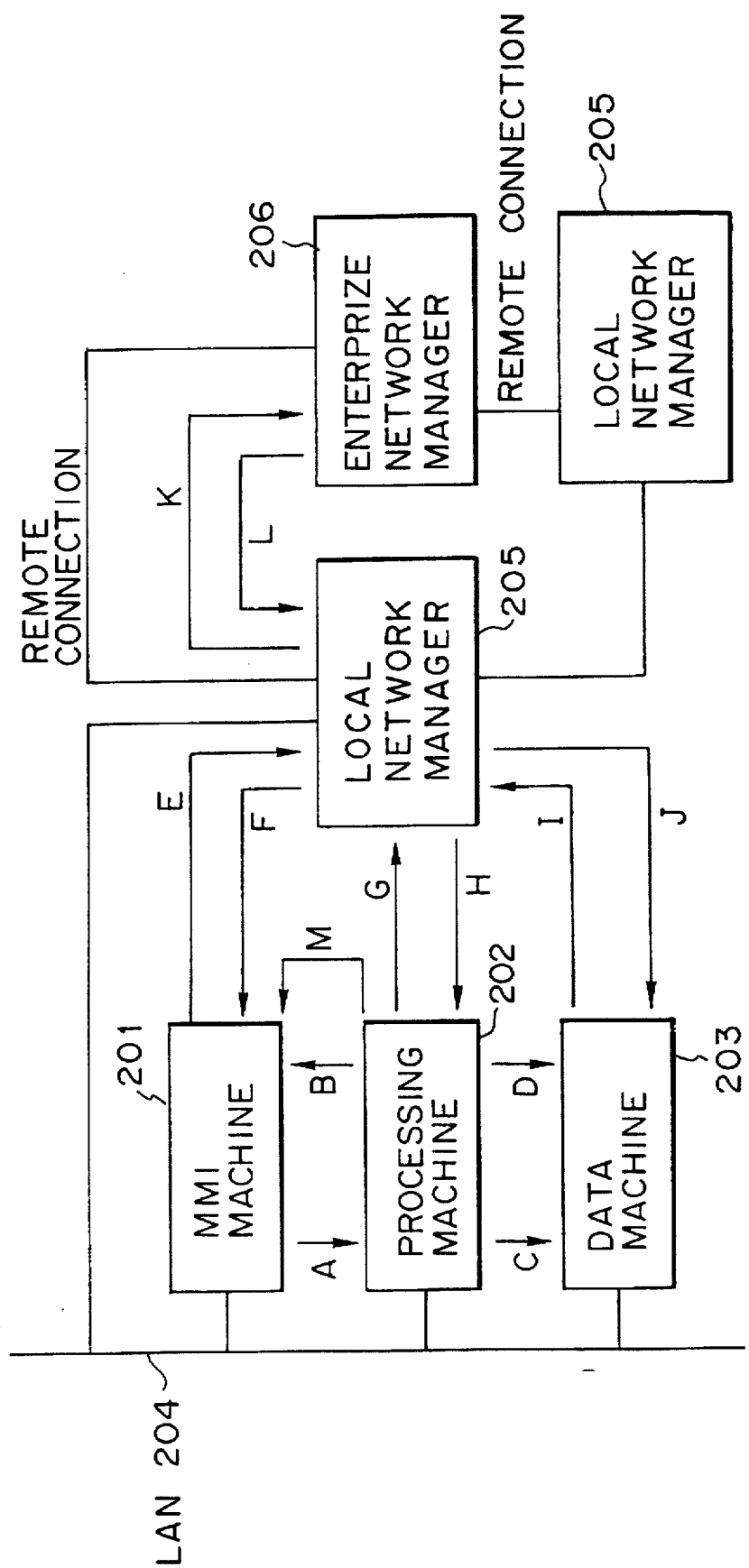
FIG. 2 is a configuration diagram of a preferred embodiment of this invention.

FIG. 2 is a configuration diagram of a data independent type computer system that is the preferred embodiment of this invention.

In this preferred embodiment, an MMI (man-machine interface) machine 201, a processing machine 202 and a data machine 203 execute operational processing with a division of labor among them.

The MMI machine 201, the processing machine 202 and the data machine 203, are connected by the local area network (LAN) 204; these connections are managed by the local network manager 205 and the enterprise network manager 206. These machines and managers perform multiple—to—multiple communication using electronic statements. Electronic statements can be sent and received between the MMI machine 201 and the processing machine 202 (electronic statements A and B in FIG. 6A), and between the processing machine 202 and the data machine 203 (electronic statements C and D in FIG. 6B), but not between the MMI machine 201 and the data machine 203. In addition, the various machines send electronic statements to and receive electronic statements from the local network manager 205 for the purpose of control. The local network manager 205 also communicates with the enterprise network manager 206.

As will be discussed below, the interfaces between the respective machines and managers are standardized. In addition, as a rule both the system programs and the application programs for each machine and manager are stored in a-built-in ROM.

An arbitrary number of MMI machines 201, processing machines 202 and data machines 203 can be connected to each LAN 204. Each LAN 204 is always connected to one local network manager 205. In addition, each LAN 204 can be connected to other LANs or a public network through a specialized gateway machine, which is one kind of processing machine 202. In such a case, it is possible for, for example, a processing machine 202 within a LAN 204 to access a data machine 203 that is connected to another network. The enterprise network manager 206 is connected to one or more LANs, and controls the LANs by exchanging electronic statements with a plurality of local network managers 205.

Figure 3:
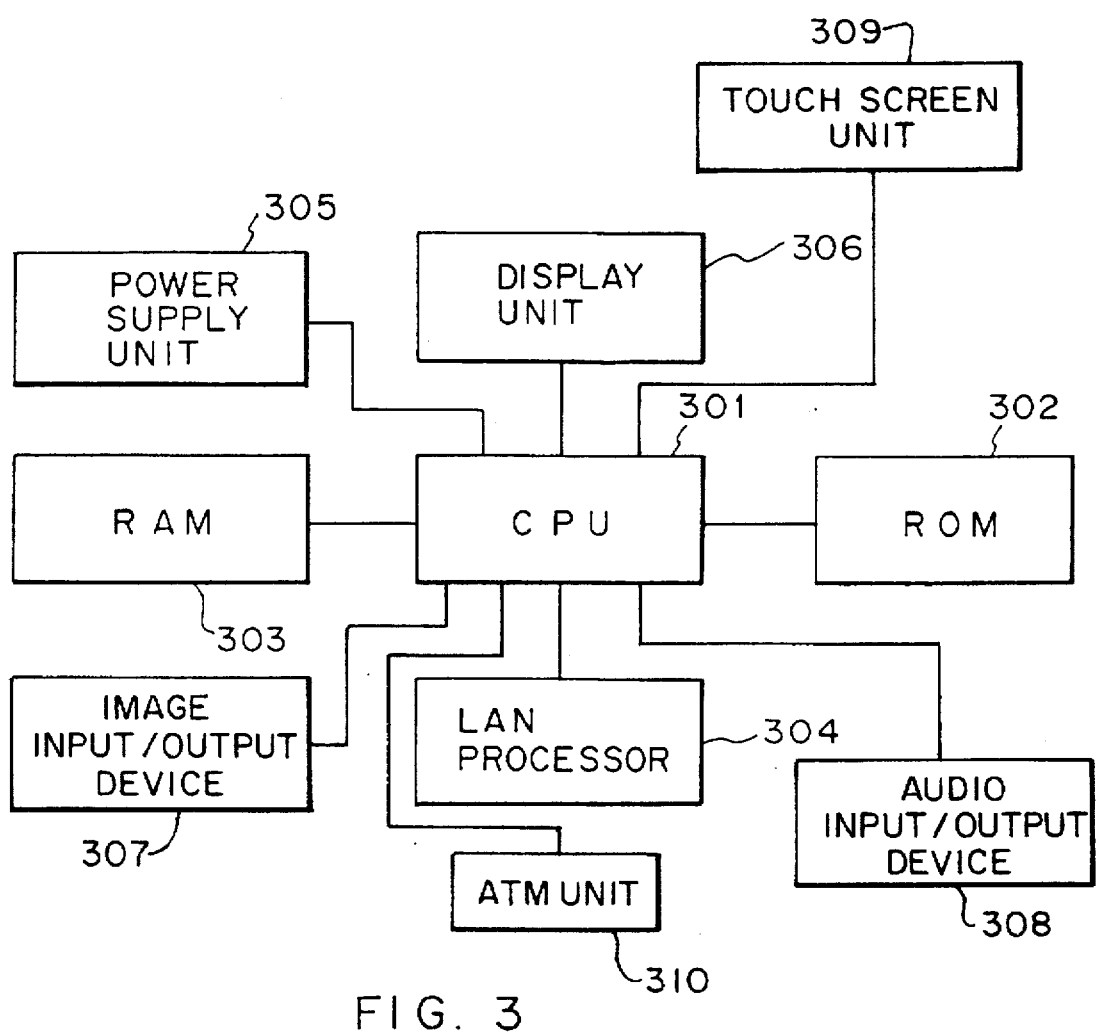
FIG. 3 is a configuration diagram of an MMI machine.

The MMI machine 201 is specially configured to have only the man-machine interface function. As shown in FIG. 3, it consists of, for example, a CPU 301, a ROM 302, a RAM 303, a LAN processor 304, a power supply unit 305, a display section 306, an image input/output device 307, an audio input/output device 308, a specialized input device such as a touch screen 309, etc., and specialized devices such as an ATM 310. The LAN processor 304 is a connection interface to the LAN 204; its function is equivalent to that of the previous network interface board.

The screens, etc. displayed on the display section 306 of the MMI machine 201 are downloaded at the time which an operational application is first started up from the processing machine 202 that processes that operational application; subsequently, only input/output items and control information for screens that have moving images and sound are sent to and received from the processing machine 202 as electronic statements. The information downloaded from the processing machine 202 is stored in the MMI machine 201, but the configuration permits it to be deleted and the downloading repeated as necessary.

It is also possible for the MMI machine 201 to execute simple local processing. In such a case, the MMI machine 201 incorporates its own exclusive data machine 203 and processing machine 202. That is to say, the MMI machine 201 is composed to have functions equivalent to those of a so-called personal computer.

Basically, there is a separate MMI machine 201 for each user, but it is also possible for a plurality of users to use the same MMI 201 alternately; it is also possible to assign each window on the display section 306 of one MMI machine 201 to a different user.

Figure 4:
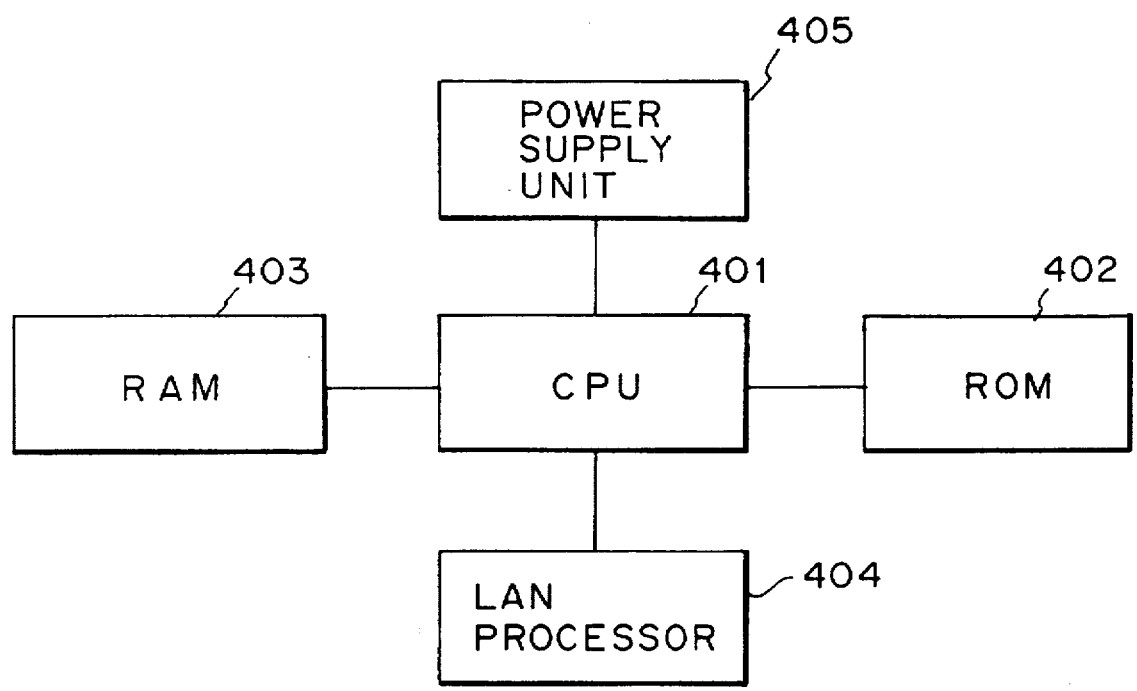
FIG. 4 is a configuration diagram of a processing machine.

Next, the processing machine 202 has the configuration of a so-called one-board computer; it consists of, for example, as shown in FIG. 4, CPU 401, ROM 402, RAM 403, LAN processor 404 and power supply unit 405.

The processing machine 202 does not require the concept of operational design. That is to say, the processing machine 202, as in, for example, previous models, can be operated by simply inserting it into a connector on the LAN 204.

A processing machine 202 is provided for each processing operation; each processing machine 202 is connected to the LAN 204 via an LAN processor 404. This operational processing is divided up among different processing machines 202 as much as possible to the extent that communication among the different processing machines 202 becomes unnecessary.

If multiplexing of the operational processing becomes necessary, a plurality of processing machines 202 are connected to the LAN 204, and their operation is coordinated. In this case, each processing machine 202 is constructed based on the so-called data-centered design, which permits the data on each data machine 203 to be accessed independently. In order to achieve this kind of data-centered processing, each operational application that is executed on a processing machine 202 is executed as an on-line program which conducts communication with the MMI machine(s) 201 and/or the data machines 203 by means of electronic statements, as will be described below. In this case, the electronic statements are standardized, as will be described below.

Figure 5:
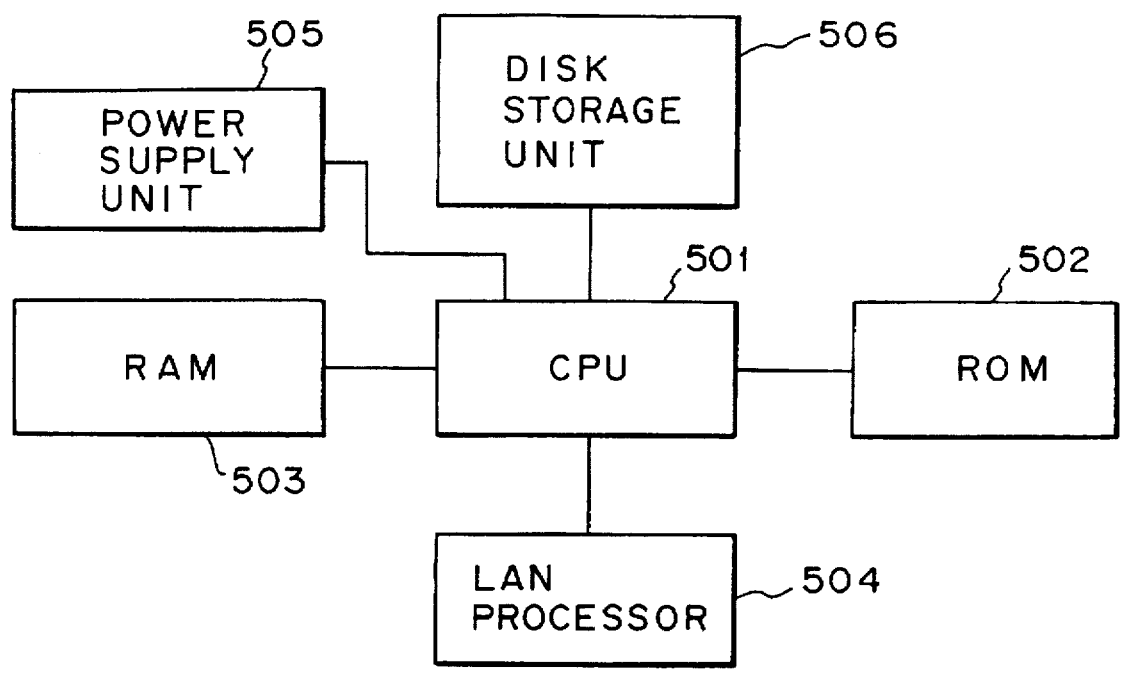
FIG. 5 is a configuration diagram of a data machine and each network manager.

Next, the data machine 203 is one kind of a so-called file server. Its function is specialized to the data or data base management function. It consists of, for example (as shown in FIG. 5), CPU 501, ROM 502, RAM 503, LAN processor 504, power supply unit 505 and disc memory unit 506.

In principle a data base having an arbitrary format can be stored in the disc memory unit 506, but each data base is managed by a common method by an exclusive-use utility machine that is one kind of processing machine 202. The differences among data bases are absorbed by the interface section in the data machine 203.

In addition, external data input from a gateway unit, a magnetic tape (MT) unit or a floppy disc unit, etc., are stored in the data machine 203 via said utility machine, the data format being converted as the data are stored. Construction of a new data base is performed by said utility machine.

The local network manager 205 and the enterprise network manager 206 are types of processing machine 202; their construction is similar to the construction of the processing machine 202 shown in FIG. 4. The local network manager 205 manages the MMI machine 201 that is connected to the same LAN 204 as said local network manager 205, the processing machine 202 and/or the addresses and security of the data machine 203. The enterprise network manager 206 manages the LAN 204 to which it is connected and the local network managers 205 that are connected to the other LANs 204 to which said LAN 204 is remotely connected, and, at the same time, manages the connection information among the LANs. When a local manager connects a new MMI machine 201, processing machine 202 or data machine 203 to the LAN 204 which it manages, the address of that machine, and whether or not it is possible to connect that machine to other machines, are registered in the local network manager 205. This registered information is also posted from the local network manager 205 to the enterprise network manager 206 and registered in it. The local network manager 205 distributes the information as to whether or not connection is possible to each machine 201, 202 and/or 203 that is connected to the LAN 204 to which it is connected, and each machine uses that information. In addition, the local network manager 205 and the enterprise network manager 206 manage the logging and posting of information on problems.

Next, FIGS. 6A to 6C show the structure of electronic statements that are sent and received among the MMI machines 201, the processing machines 202 and/or the data machines 203.

These electronic statements include the electronic statements A and B that are sent and received among the MMI machines 201 and the processing machines 202, and the electronic statements C and D that are sent and received among the processing machines 202 and the data machines 203.

First, the electronic statements A and B that are sent and received among the MMI machines 201 and the processing machines 202 have the structure shown in FIG. 6A.

In FIG. 6A, the first electronic statement control 601 has the structure shown in FIG. 6C.

In FIG. 6C, the electronic statement identification code 609 gives information that identifies the type of electronic statement, for example whether the electronic statement A or B is an ordinary electronic statement, an electronic statement sent at the time when a device connection is automatically created, or an electronic statement to which security information has been added.

The source ID 610 and the destination ID 611 are global addresses of the LAN 204; for example, they may be physical addresses (network addresses) assigned to the LAN processors 304, 404 and 504 of each machine.

The user ID 612 indicates the user who generated the electronic statement in which it is contained.

The electronic statement identification serial number 613 gives the order of transmission of electronic statements when information is divided up among a plurality of electronic statements to be sent.

The sending time 614 gives the time at which that electronic statement was sent; it is used in trouble investigation, response measurement, etc.

Returning to the structure shown in FIG. 6A, the operation ID 602 is an identifier which classifies the type of operational processing performed by the processing machine 202, for example, daily order reception table processing or loan table output processing.

The screen ID 603 is an identifier which specifies one among a plurality of screens displayed on the display section 306 of the MMI machine 201 in the processing of one operation.

The screen control information 604 includes information that indicates that the display section 306 of the MMI machine 201 is presently waiting for a screen or that the screen on it presently is flashing; and information that controls moving images displayed on the display section 306.

The data area information 605 indicates how the next data area 606 is being used or, for example, in what areas data are currently stored.

Input items and output items for the display section 306 of the MMI machine 201 are stored in data item units in the data area 306.

Next, the electronic statements C and D exchanged among the processing machines 202 and the data machines 203 have the structure shown in FIG. 6B.

In FIG. 6B, the first statement control 601 has the structure shown in FIG. 6C, as in the case of the electronic statements A and B shown in FIG. 6A.

The operation ID 602 is similar to that of the electronic statements A and B shown in FIG. 6A.

The file ID 607 is an identifier that identifies the file to be accessed.

The search control information 608 sets an additional search condition to specify the search processing to be done with respect to a data base in the data machine 203, to be done in such cases as when the data being searched for are redundant, when data having the specified conditions cannot be found or when a search error occurs.

The data area information 605 is similar to that for the electronic statements A and B shown in FIG. 6A.

The data area 606 also has a structure similar to that for the electronic statements A and B shown in FIG. 6A. When the electronic statement C specifies search processing, the write-in conditions and the search key at that time using the SQL language, which is one of the data base handling languages, are stored in the data area 606 of the electronic statement C sent from a processing machine 202 to a data machine 203; when the electronic statement C specifies write-in processing, the data to be written in are stored in this area. Conversely, the data resulting from the search processing or the write-in processing specified by the electronic statement C are stored in the data area 606 of the electronic statement D sent from the data machine 203 to the processing machine 202.

The electronic statements shown in FIGS. 6A to 6C above are transferred after being stored in the data field of the packet sent on the LAN 204 according to the LAN 204 protocol.

The process that takes place during the operational processing that is done in accordance with the electronic statements described above will now be explained using the example of an order-receiving operation shown in the process explanation diagram in FIG. 7.

First, the MMI machine 201 displays the initial menu on the display section 306 (step 701).

When, in response to this, a user such as a telephone operator selects the order receiving operation (step 702), the MMI machine 201 displays the order receiving screen on the display section 306 (step 703).

The user inputs the order on that screen (step 704). The input items include product name, code, quantity, etc.

The MMI machine 201 sends those input items to the processing machine 202 as the electronic statement A (step 705).

The processing machine 202 searches the inventory file in order to perform an inventory check. Specifically, the processing machine 202 creates an SQL statement that gives the inventory file search conditions based on the input items received from the MMI machine 201; these are stored in an electronic statement C together with the file ID, and that electronic statement C is sent to the data machine 203 (step 706).

The data machine 203 searches the inventory file based on the contents of the electronic statement C received from the processing machine 202 (step 707), and posts the result of the search to the processing machine 202 as the electronic statement D (step 708).

For example, if the ordered items are in stock, the processing machine 202 creates an SQL statement that indicates that the data machine 203 is requested to update the order master; that statement is then stored in an electronic statement C together with the file ID, and that electronic statement C is sent to the data machine 203 (step 709).

The data machine 203 executes order master update processing based on the contents of the electronic statement C received from the processing machine 202 (step 710), and then posts the result of the update to the processing machine 202 as the electronic statement D (step 711).

When the result of the update is posted from the data machine 203 to the processing machine 202, screen output data are sent from the processing machine 202 to the MMI machine 201 as an electronic statement B (step 712), then the MMI machine 201 displays the result of the processing on the display section 306 (step 713). In the order receiving operation processing described above, the data machine 203 in which the inventory file is stored need not be the same as the data machine 203 in which the order master is stored. The processing machine 202 in which the order receiving operation is performed can be, for example, a single machine.

Next, the data configuration and the action that make it possible for the MMI machine 201, the processing machine 202 and the data machine 203 to be automatically connected to the LAN 204 will be explained.

FIGS. 8A to 8E show the structures of the electronic statements which, when the MMI machine 201, the processing machines 202 and the data machines 203, are connected to the LAN 204, are exchanged among those machines and the local network manager 205 and between the local network manager 205 and the enterprise network manager 206.

First, the electronic statement E, G or I is sent from the MMI machine 201, a processing machine 202 or a data machine 203 to the local network manager 205. These statements have the structure shown in FIG. 8A.

The first electronic statement control 601 in FIG. 8A has the structure shown in FIG. 6C, similar to the case of the electronic statements A and B shown in FIG. 6A.

The device management information 801 is the so-called self-introduction information of the machine that sent the electronic statement in which it is contained; it includes information that does not depend on the particular operation, such as the ID, installation location, function, manager, person to contact in case of trouble, etc. for each machine.

The circuit information 802 is address information such as the global MAC address, PU, LU, etc. of the machine that sent the electronic statement in which it is contained.

The self-attributes area information 803 is information that indicates how the next self-attributes area above it, 804, is to be used; for example, it indicates in which areas data are currently stored.

The information contained in the self-attributes area 803 is essential. If the machine that sent the electronic statement that contains it is the MMI machine 201, then information such as whether or not that machine has a Windows system, the type of terminal of that machine (voice, screen, etc.), is stored in the self-attributes area 804. If the machine that sent the electronic statement that contains it is a processing machine 202, then information such as the type of operational processing, the type of data used in each operational processing, etc., is stored in the self-attributes area 804. If the machine that sent the electronic statement that contains it is a data machine 203, then information such as the type of file stored in that machine is stored in the self-attributes area 804.

Next, the electronic statements F, H and J are sent from the local network manager 205 to the MMI machine 201, a processing machine 202 or a data machine 203. These electronic statements have the structure shown in FIG. 8B.

In FIG. 8B, the first electronic statement control 601 has the structure shown in FIG. 6C, similar to that in the case of the electronic statements A and B shown in FIG. 6A.

The connectable device information 805 is information that indicates how the area of the next higher connectable device 806 is used; for example, in what areas data are currently stored.

The connectable device 806 indicates to what other machines the destination machine of the electronic statement in which it is included is connected.

Next, as a result of the posting of the electronic statement H from the local network manager 205 to the processing machine 202, the electronic statement G is sent from that processing machine 202 to the MMI machine 201. This electronic statement has the structure shown in FIG. 8C.

In FIG. 8C, the first electronic statement control 601 has the structure shown in FIG. 6C, similar to that in the case of the electronic statements A and B shown in FIG. 6A.

The screen definer information 807 is information that indicates how the area of the next higher screen definer 808 is used; for example, in what areas data are currently stored.

The screen definer 808 gives information relating to the display screen on which the MMI machine 201, that is the destination of that electronic statement, displays information to be processed by the user, in response to the operational processing that is executed by the processing machine 202 to which the electronic statement that includes it is sent.

In addition, the local network manager 205 sends the electronic statement K to the enterprise network manager 206. This electronic statement has the structure shown in FIG. 8D.

In FIG. 8D, the first electronic statement control 601 has the structure shown in FIG. 6C, similar to that in the case of the electronic statements A and B shown in FIG. 6A.

The local definition information 809 is information that indicates how the area of the next higher local definition 810 is used; for example, in what areas data are currently stored. The The local definition 810 indicates the device connection definitions of the respective machines 201, 202 and 203 that the local network manager 205 which sent the electronic statement in which it is included manages.

Finally, the electronic statement L is sent from the enterprise network manager 206 to the local network manager 205. This electronic statement has the structure shown in FIG. 8E.

In FIG. 8E, the first electronic statement control 6A has the structure shown in FIG. 6C, similar to that for the cases of the electronic statements A and B shown in FIG. 6A.

The remote definition information 811 is information that indicates how the area of the next higher remote definition 812 is used; for example, in what areas data are currently stored.

The remote definition 812 is connection information concerning the connections of the respective machines 201, 202 and 203 that are connected to the LAN 204 which the local network manager 205 manages, that is the destination of the electronic statement in which it is included, manages to machines that are connected to other LANs.

Next, the connection management tables that are managed by the local network manager 205 and the enterprise network manager 206 will be explained.

Figures 9A, 9B:
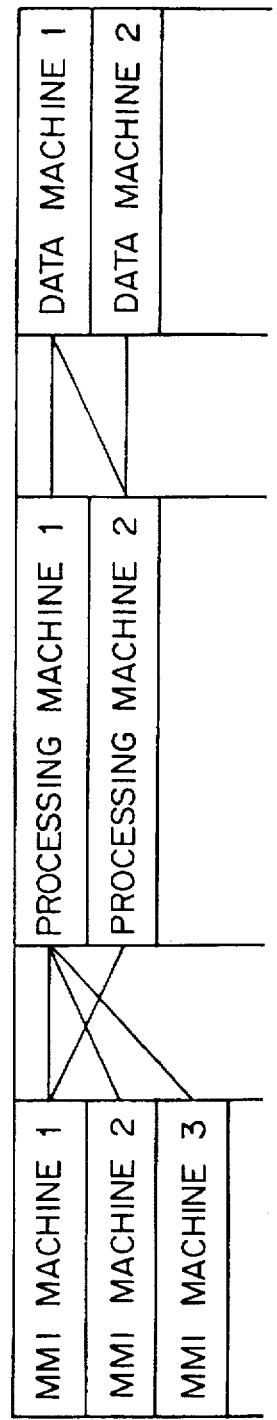
FIGS. 9A and 9B are configuration diagrams of a connection management table managed by the local network manager.

First, the local network manager 205 manages the connection management table that consists of the basic information 901 shown in FIG. 9A and the connection information 902 shown in FIG. 9B. Here, the local network manager 205 is a kind of processing machine 202 having, for example, the structure shown in FIG. 4. The connection management table is stored in one of the data machines 203; the local network manager 205 accesses the data machine 203 in which the connection management table is stored. In this case, the electronic statements C and D shown in FIG. 6B are used. In addition, if the so-called local manager updates the connection management table that the local network manager 205 manages, each manager accesses the local network manager 205 from one of the MMI machines 201. In this case, the electronic statements A and B shown in FIG. 6A are used.

In the basic information 901 shown in FIG. 9A, one horizontal line record corresponds to one machine.

First, the data item 903 indicates to which machine that record corresponds; for example, the machine ID included in the device management information 801 of the electronic statements E, G and I posted from that machine is set.

The data item 904 is identification information that indicates whether the machine that corresponds to that record is a machine that is connected to the LAN 204 to which the local network manager 205 that includes that data item 904 is connected (meaning that it is local) or to another LAN (meaning that it is remote). A record to which the identifier "remote" is attached is always added to the basic information on instruction from the enterprise network manager 206.

The data item 905 indicates address information such as the global MAC address, PU, LU, etc. of the machine that corresponds to that record; the circuit information 802 (refer to FIG. 8A) is set in the electronic statements E, G and I posted from that machine.

The data item 906 indicates the attributes of the machine that corresponds to that record; the information in the self-attributes areas 804 (refer to FIG. 8A) of the electronic statements E, G and I posted from that machine is set here.

Next, the connection information 902 shown in FIG. 9B indicates how the MMI machines 201, the processing machines 202 and the data machines 203 are connected, in the specified data format. The format in which this connection information 902 is set can be the format that directly defines the connections among the individual machines, but if the number of machines (nodes) becomes large, making definition difficult, a format using the super class 1101 such as that shown in FIG. 11A can be used to define the connections among the machines. In the example in FIG. 11A, MMIS1 is defined as a super class 1101 for the MMI machines 1 to 3 (corresponding to the MMI machine 201 in FIG. 2), the processing machine S1 is defined as a super class 1101 for the processing machines 1 and 2 (corresponding to the processing machine 202 in FIG. 2) and the data machine S1 is defined as a super class 1101 for the data machines 1 and 2 (corresponding to the data machine 203 in FIG. 2). In addition to the definitions of the connections among the super classes 1101, a definition format in which direct definitions of the connections between individual machines and direct definitions of non-connections between individual machines (definitions that indicate that the machines are not connected) are mixed, is given. In addition, it is also possible to define super classes hierarchically. In such a case, if the definitions between super classes 1101 differ from the direct definitions between individual machines, the direct definitions between individual machines take priority. If the definitions of connections contradict the definitions of non-connections, the definitions of non-connections have priority. If a specified access right is set, the definition with the weakest access right takes priority.

Next, the enterprise network manager 206 manages a connection management table that consists of the overall information 1001, the basic information 1002 and the connection information 1003 given in FIGS. 10A to 10C. As in the case of the local network manager 205, the enterprise network manager 206 is a kind of processing machine 202 that has, for example, the structure shown in FIG. 4. The connection management table is stored in one of the data machines 203; the enterprise network manager 206 accesses the data machine 203 in which the connection management table is stored. If the so-called enterprise managers update the connection management table that is managed by the enterprise network manager 206, each manager accesses the enterprise network manager 206 from one of the MMI machines 201.

In FIGS. 10A to 10C, the basic information 1002 in FIG. 10B and the connection information 1003 in FIG. 10C are basically the same information as the basic information 901 in FIG. 9A and the connection information 902 in FIG. 9B, posted from the local network manager 205 that is managed by the enterprise network manager 206 that is managed by the connection management table in which they are included. However, in the basic information 1002 shown in FIG. 10B, the data item 904, that was necessary in the basic information 901 shown in FIG. 9A, has become unnecessary; instead, there is a data item 1004 in which local IDs, identifying the LAN 204 to which each record described in it belongs, is set. Also, in the connection information 1003, there is a data item 1005 in which local IDs, identifying the LAN 204 to which each machine described in it belongs, are set. As in the case of the connection information 902 in the local network manager 205 (FIG. 9B), if the number of machines (nodes) increases so that definition becomes difficult, a super class 1102 such as that shown in FIG. 11B can be used to define the connections among the machines.

In the overall information 1001 shown in FIG. 10A one horizontal record corresponds to one LAN 204. Each record consists of a data item 1006 in which a local ID that identifies each LAN 204 is set, a data item 1007 in which remote circuit information that is the circuit information for remote access to each LAN 204 is set, and a data item 1008 in which the attributes of that circuit are set.

Figure 12:
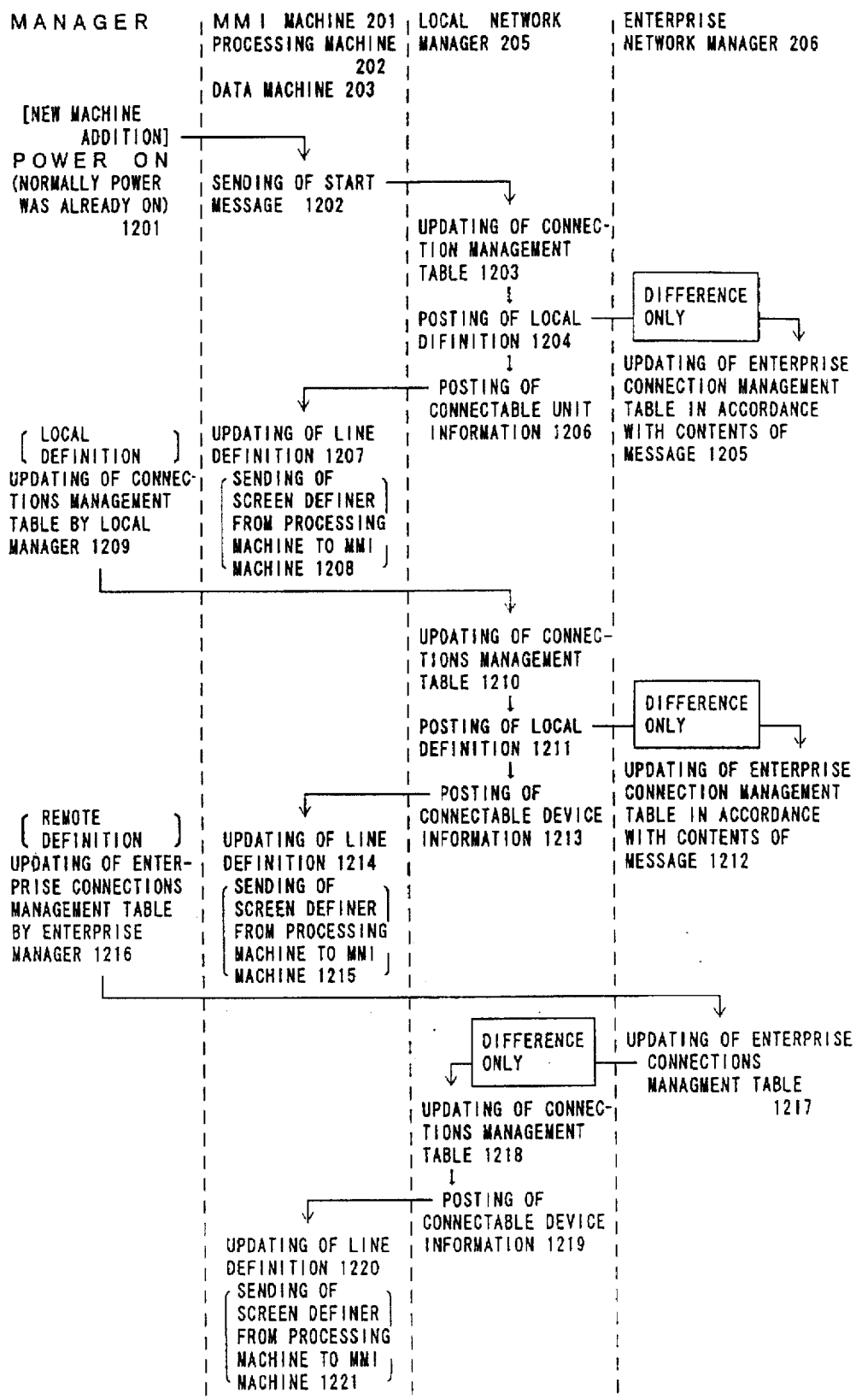
FIG. 12 is a diagram that explains the process of a preferred embodiment (example 2).

Now the explanation of system operation shown in FIG. 12 will be used to explain the automatic creation and updating of the device connection definitions, brought into being using the electronic statements shown in FIGS. 8A to 8E and the connection management table shown in FIGS. 9A, 9B and 10A to 10C; and the action of updating the circuit definitions in each machine.

First, the following 3 events can produce the need for updating the circuit definitions of each machine.

1. Addition of a new device: a local manager connects a new machine to an LAN.

2. Local definition: a local manager updates a device connection definition in the LAN that he/she manages.

3. Remote definition: the enterprise manager updates a device connection definition that spans across a plurality of LANs (domains).

First, an example of operation in the case of addition of a new device will be explained.

The local manager connects a new machine, one of an MMI machine 201, a processing machine 202 or a data machine 203 to the LAN 204, specifies only the address of the local network manager 205 that manages that LAN 204, and turns the power ON (step 1201).

As a result, the machine 201, 202 or 203 to which the power was turned ON (referred to hereafter as the newly added machine) sends a connection start message using an electronic statement E, G or I shown in FIG. 8A to the local network manager 205 (step 1202).

When the local network manager 205 receives the electronic statement, then the connection management table that it manages is updated by adding a record that corresponds to the newly added machine that sent the electronic statement to the basic information 901 (FIG. 9A) of the connection management table (step 1203). In this record, the machine ID included in the unit management information 801 of the received electronic statement (see FIG. 8A) is set in the data item 903 shown in FIG. 9A, the identifier "local" is set in the data item 904, the line information 802 of the received electronic statement (see FIG. 8A) is set in the data item 905, and information on the self-attributes area 804 of the received electronic statement is set in the data item 906. The local network manager 205 sets information that indicates that only a specified MMI machine 201 can be connected as the connection information 902 (FIG. 9B) in the connections management table.

Next, the local network manager 205 posts the definition of said newly added record local definition to the enterprise network manager 206 using the electronic statement K shown in FIG. 8D (step 1204).

When the enterprise network manager 206 receives said electronic statement described above, the connections management table that it manages is updated by adding a new record corresponding to the local definition 810 (see FIG. 8D) stored in the received electronic statement to the basic information 1002 (FIG. 10B) in the connections management table (step 1205).

The local network manager 205 posts the local definition to the enterprise network manager 206, and, at the same time, based on the processing in step 1202, posts the connectable device 806 information to the newly added machine that is the source of the received electronic statement, using the electronic statement F, H or J shown in FIG. 8B step 1206. As the connectable device 806 information, for example, as a default, information indicating that only a specified MMI machine 201 can be connected is set.

When said electronic statement is received, the newly added machine, based on the connectable device 806 information set in that electronic statement, updates the line definition set in the RAM of that machine (step 1207). A line definition is a file in which the identities of the other machines to which that machine can be connected and the attributes of the connected circuits (transmission rate, protocol, etc.) are set. Each machine, when communicating with another machine, communicates according to the attributes in that file. This line definition is, for example, in the memory of each machine, and disappears when the power is turned OFF. That is to say, every time each machine is connected to the LAN 204, it receives information relating to the line definition from the local network manager 205.

If the newly added machine is a processing machine 202, that newly added machine sends a screen definer for the screen which the MMI machine 201, which the local network manager 205 posted as the default connectable MMI machine 201 in the processing of step 1206, to said MMI machine 201 (step 1208). As a result, although not shown in the figures here, said MMI machine 201 displays on the screen corresponding to the posted screen definer.

In the action described above, when one machine is disconnected from the LAN 204, information relating to that machine on the connections management table is not deleted; instead, information indicating that the machine has been disconnected from the LAN 204 is added, so that the next time that machine is connected to the LAN 204, it is only necessary to search for the code corresponding to that machine on the connections management table; it is not necessary to correct the local definition described below every time that machine is connected to or disconnected from the LAN 204.

Next, an example of the operation in the case of a local definition will be explained.

If a local manager desires to change a device connection definition in the LAN that he/she manages, and if for example it is desired to add a more detailed connection definition for a newly added machine after the new device addition described above, first the connections management table updating function is started from an MMI machine 201 which the local network manager 205 can access, then, using the connections management table updating display screen, instructions for updating the connection management table are given (step 1209). As a result, although not shown in the figures here, instructions for updating the connections management table are given from said MMI machine 201 to the local network manager 205, using the electronic statement A in FIG. 6A.

When the local network manager 205 receives said electronic statement, the connections management table which it manages is updated by executing the update processing specified by the received electronic statement in the basic information 901 (FIG. 9A) or the connection information 902 (FIG. 9B) of that connections management table (step 1210).

Next, the local network manager 205 posts the definition of said updated record (the local definition) to the enterprise network manager 206 using the electronic statement K shown in FIG. 8D (step 1211).

When the enterprise network manager 206 receives the electronic statement, it updates the connections management table that it manages by updating the record corresponding to the local definition 810 stored in the received electronic statement (see FIG. 8D) in the basic information 1002 (FIG. 10B) or the connection information 1003 (FIG. 10C) of the connections management table (step 1212).

In addition, the local network manager 205 posts the local definition to the enterprise network manager 206 and, at the same time, posts the connectable device 806 information to the machine that is the object of the updating of the connections management table, using the electronic statement F, H or J shown in FIG. 8B (step 1213).

When said electronic statement is received, each machine updates the line definition set in its RAM based on the connectable device 806 information set in the electronic statement (step 1214).

If said machine described above is a processing machine 202, that processing machine 202 sends a screen definer for the screen on which said MMI machine 201 performs its display for the operational processing being executed, to said MMI machine 201 using the electronic statement M shown in FIG. 8C (step 1215). As a result, although not shown in the figures here, said MMI machine 201 displays on the screen corresponding to the posted screen definer.

Finally, an example of the operation in the case of a remote definition will be explained.

If the enterprise manager wishes to update a device connection definition among a plurality of LANs that he/she manages, first the connections management table updating function is started in the enterprise network manager 206 from an accessible MMI 201; then an instruction to update the connections management table is given using the connections management table updating display screen (step 1216). As a result, although it is not shown in the figures here, a connections management table updating instruction is given from said MMI machine 201 to the enterprise network manager 206 using the electronic statement A shown in FIG. 6A.

When the enterprise network manager 206 receives said electronic statement described above, the connections management table is updated by executing the updating processing specified by the received electronic statement in the overall information 1001 (FIG. 10A), the basic information 1002 (FIG. 10B) or the connections information 1003 (FIG. 10C) of the connections management table that it manages (step 1217).

Next, the enterprise network manager 206 posts the definition of said updated record (remote definition) to the local network manager 205 corresponding to the local ID set in the data item 1004, 1005 or 1006 of the record that is the object of updating using the electronic statement L shown in FIG. 8E.

When the local network manager 205 receives said electronic statement described above, it updates the connections management table by updating the record corresponding to the remote definition 812 (see FIG. 8E) stored in the received electronic statement in the basic information 901 (FIG. 9A) or the connection information 902 (FIG. 9B) of the connections management table that it manages (step 1218).

In addition, the local network manager 205 posts the information concerning the connectable device 806 to the machine that is the object of the connections management table updating using the electronic statement F, H or J shown in FIG. 8B (step 1219).

When each machine receives said electronic statement described above, the line definition set in the RAM of that machine is updated based on the information concerning the connectable device 806 that is set in that electronic statement (step 1220).

If said machine described above is a processing machine 202, that processing machine 202 sends the screen definer of the screen on which the MMI machine 201, to which that processing machine 202 is connected, performs its display corresponding to the operational processing which that processing machine 202 executes, to said MMI machine 201 using the electronic statement M shown in FIG. 8C (step 1221). As a result, although it is not shown in the figures here, said MMI machine 201 displays on the screen corresponding to the posted screen definer.

In the preferred embodiment described above, the computer system functions are divided into 3 parts: MMI (man-machine interface), processing and data. The system has a configuration in which MMI machines 201, processing machines 202 and data machines 203 which specialize in these functions are connected by the LAN 204.

Thus, by using a configuration in which hardware having specialized functions is connected by a network, we obtain the first advantage: simplification of the system configuration which in previous computer systems had grown to large proportions. That is to say, first, the function of the processing machine 202 is extremely simple, as shown in, for example, FIG. 4. Namely, the hardware and the operational software are provided in a single unit; it is guaranteed that only certain software will be executed on each piece of hardware. For this reason, in memory management, the allocation of memory areas becomes fixed and virtual space control, for example, becomes unnecessary, so that, for example, swap-in/swap-out control of program data becomes unnecessary. In addition, it is sufficient for the task control to be single task control, so that process management, priority management, etc. become unnecessary. Thus, in the processing machine 202, most of the functions that are considered necessary in present operating systems become unnecessary.

In addition, the data machine 203 needs have only the functions of data search or updating, or data write-in or read-out, so that its functions are extremely simplified. Further, in the MMI machine 201, it is sufficient to have only the man-machine interface function; a data storage function becomes unnecessary. For this reason, the MMI machine 201 can be a simple machine, with functions of the order of those that are possessed by personal computers. By thus simplifying the computer system, the overall reliability of the system is greatly improved, and it becomes possible to use a low-priced CPU in, for example the processing machine 202, so that the performance/cost ratio of the computer system can be greatly improved. In addition, since changes in the operations can be dealt with simply by adding or replacing machines, it is possible to construct a computer system that is flexible, efficient and easily expandable.

Further, using a separate data machine 203 for each data base virtually eliminates the danger that one operation will be delayed by another operation. In addition, as a result of the hardware and software being combined in one unit in the processing machine 202 and the MMI machine 201, it is possible to complete the system setup merely by connecting these to the LAN and turning the power ON, and if trouble should occur in one of the machines it is sufficient to merely replace that machine.

Another feature of this invention is that the local network manager 205 and the enterprise network manager 206 provide unified management of the connection information of the machines 201, 202 and 203 to the LAN 204, so that if a new machine is connected to the LAN 204, electronic statements E, G and I in which the connection information of that machine is stored, are automatically sent from that device to the LAN 204. Consequently, operational management and trouble management for the overall computer system can be concentrated in the local network manager 205, the enterprise network manager 206, the LAN 204 (the network) and the data machine 203, dramatically simplifying the computer management.

A second advantage is that by having a configuration in which specialized machines are connected in a network, it becomes easy to standardize the communication specifications among the machines. Specifically, communication among machines is standardized in the form of operational level electronic statements which consist of information to which it is easy to attach correspondence to operations, such as the user ID 612, the operation ID 602, the screen ID 603, the file ID 607, an SQL statement, etc.; such electronic statements are used, and operational processing is left to machines that have specialized independent functions. As a result, it is possible to promote the reuse of machines and reduce redundancy through development.

A third advantage is that the processing machines 202 and the data machines 203 are specialized for operational functions and data, respectively, and in addition communication among machines is limited to operational level electronic statements; as a result, the computer system configuration and the form of execution can be made to correspond to the organization and mode of operation of business companies. As a result, a specialist in the operation being performed can easily construct a system, even if he does not have much knowledge of computers or networks. Specifically, in a definition of connection information that is managed by the local network manager 205 or the enterprise network manager 206 (device connection definition), the MMI machines 201, the processing machines 202 and the data machines 203 respectively are directly involved in operational processing, so device connection definitions can be performed in a manner similar to that in which the relationships among operational processes are defined. Consequently, if a local manager performs a local definition in the local network manager 205, or the enterprise manager performs a remote definition in the enterprise network manager 206, specialized knowledge of computers and networks is not needed. This greatly reduces the burden on and the cost to both the vendor and the customer when a computer system is constructed. In addition, the hierarchical structure of device connection definitions consisting of the local network manager 205 and the enterprise network manager 206 can be made to correspond to the hierarchical structure of the operational processing; this also helps to make management of the device connection definitions more intuitive.

A fourth advantage is that, as a result of connecting the data machines 203 to the LAN 204, and to another LAN or to a public network as an independent configuration, and of standardizing access to the data machines 203 in the form of operational level electronic statements, it is also possible to establish a centralized data center where data management is concentrated. The result is to greatly reduce the cost of holding data and the risk involved.

In the preferred embodiment described above, in contrast to previous examples, operational processing is transmitted by electronic statements as units, so that network traffic is not needlessly increased. For example, in accessing a data base in the data machine 203, all transaction files are simultaneously taken to the processing machine 202, decompressed in memory and processed.

What is claimed is:

1. An automatic creation system for device connection definitions in a data independent type computer system connected to a network, said automatic creation system comprising:

a processing machine which receives from the network first electronic statements containing operational processing requests from the network, sends second electronic statements containing results of operational processing to the network, sends third electronic statements containing data access requests to the network, receives fourth electronic statements containing results of data access from the network, and executes the operational processing corresponding to the first through fourth electronic statements;

a data machine which receives the third electronic statements containing the data access requests from the network, sends the fourth electronic statements containing the results of the data access requests to the network, and accesses stored data in response to the third electronic statements;

a man-machine interface machine which sends the first electronic statements containing the operational processing requests to the network, receives the second electronic statements containing the results of the operational processing from the network, and executes man-machine-interface processing corresponding to the first and second electronic statements;

means for connecting at least one of said processing machine, said data machine and said man-machine interface machine to the network; and a first network manager, connected to the network, which manages the connection attributes and the connection relationships among any of said processing machine, said data machine and said man-machine interface machine connected to the network.

2. An automatic creation system for device connection definitions as described in claim 1, wherein said first network manager, at the time at which at least one of said processing machine, said data machine and said man-machine interface machine is connected to the network, acquires the connection attributes of the at least one of said processing machine, said data machine and said man-machine interface machine by receiving a fifth electronic statement containing the connection attributes from each of said processing, data and man-machine interface machines to each other of said processing, data and man-machine interface machines; receives changes in the connection relationships among said processing machine, said data machine and said man-machine interface machine on the network; and, at a time when a change in the connection relationships occurs, sends a sixth electronic statement containing information relating to the change in the connection relationships, to each of said processing machine, said data machine and said man-machine interface machine that is involved in the change; and wherein each of said processing machine, said data machine and said man-machine interface machine, upon receiving the electronic statement, changes the connection status thereof based on the information relating to the change in the connection relationships contained in the sixth electronic statement.

3. An automatic creation system to create device connection definitions as described in claim 1, wherein said first network manager manages the connection attributes or the connection relationships together, which are common among any of said processing machine, said data machine and said man-machine interface machine.

4. An automatic creation system to create device connection definitions as described in claim 3, wherein said first network manager hierarchically incorporates and manages further common connection attributes or connection relationships which are managed together in said first network manager.

5. An automatic creation system to create device connection definitions as described in claim 1, wherein the network consists of a plurality of local networks, wherein said first network manager is connected to a first local network and manages the connection attributes when at least one of said processing machine, said data machine and said man-machine interface machine is connected to the first local network, and manages the connection relationships among said processing machine, said data machine and said man-machine interface machine on the first local network; and wherein said automatic creation system further comprises a second network manager connected to a second local network, to manage the connection attributes when at least one of said processing machine, said data machine and said man/machine interface machine is connected to the second local network, and to manage the connection relationships among said processing machine, said data machine and said man-machine interface machine on the second local network.

6. An automatic system to create device connection definitions as described in claim 5, wherein at a time at which there is a change in management status of at least one of the connection attributes and the connection relationships in said first network manager, said second network manager changes the management status therein by receiving a fifth electronic statement containing first information relating to the change in the management status of the at least one of the connection attributes and the connection relationships, from said first network manager, receives the change in the connection relationships among said processing machine, said data machine and said man-machine interface machine in the plurality of said local networks; and sends a sixth electronic statement containing second information relating to the change to said first network manager; and wherein said first network manager upon receiving the sixth electronic statement changes the management status therein based on the information relating to the change in the connection relationships in the sixth electronic statement.

7. An automatic system to create device connection definitions as described in claim 5, wherein at least one of said first and second network managers manages any of the connection attributes and the connection relationships together, which are common among said processing machine, said data machine and said man-machine interface machine.

8. An automatic system to create device connection definitions as described in claim 5, wherein at least one of said first and second network managers hierarchically incorporates and manages further common connection attributes or connection relationships which are managed together in said first network manager.

* * * * *